US009274763B2

(12) United States Patent
Allsbrook

(10) Patent No.: US 9,274,763 B2
(45) **Date of Patent: *Mar. 1, 2016**

(54) SYSTEM AND METHOD FOR CREATING A DEVELOPMENT AND OPERATIONAL PLATFORM FOR MOBILE APPLICATIONS

(71) Applicant: ClearBlade, Inc., Austin, TX (US)

(72) Inventor: David Aaron Allsbrook, Raleigh/Durham, NC (US)

(73) Assignee: Clearblade, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,737

(22) Filed: May 6, 2015

(65) Prior Publication Data

US 2015/0234639 A1 Aug. 20, 2015

Related U.S. Application Data

(63) Continuation of application No. 14/256,667, filed on Apr. 18, 2014, now Pat. No. 9,038,015.

(60) Provisional application No. 61/815,085, filed on Apr. 23, 2013.

(51) Int. Cl.
*G06F 9/44* (2006.01)

(52) U.S. Cl.
CPC .. *G06F 8/35* (2013.01); *G06F 8/20* (2013.01); *G06F 8/30* (2013.01)

(58) Field of Classification Search
None
See application file for complete search history.

(56) References Cited

U.S. PATENT DOCUMENTS

| | | | | |
|---|---|---|---|---|
| 7,912,935 | B2 * | 3/2011 | Merissert-Coffinieres et al. | 709/223 |
| 8,671,389 | B1 * | 3/2014 | Buryak et al. | 717/109 |
| 9,047,308 | B2 | 6/2015 | Bickle et al. | |
| 2002/0033843 | A1 * | 3/2002 | Loos et al. | 345/740 |
| 2006/0234730 | A1 * | 10/2006 | Bibr et al. | 455/466 |
| 2007/0174490 | A1 * | 7/2007 | Choi et al. | 709/246 |
| 2009/0183138 | A1 * | 7/2009 | Loos et al. | 717/105 |
| 2009/0300578 | A1 * | 12/2009 | Neil | 717/104 |
| 2011/0161912 | A1 * | 6/2011 | Eteminan et al. | 717/101 |
| 2014/0026113 | A1 * | 1/2014 | Farooqi | 717/107 |
| 2014/0082586 | A1 * | 3/2014 | Casey | 717/104 |
| 2014/0101635 | A1 * | 4/2014 | Hoffmann | 717/106 |
| 2014/0109078 | A1 * | 4/2014 | Lang et al. | 717/172 |
| 2014/0173554 | A1 * | 6/2014 | Gupta | 717/106 |

(Continued)

FOREIGN PATENT DOCUMENTS

KR 10-2010-0101933 4/2012

*Primary Examiner* — Isaac T Tecklu
(74) *Attorney, Agent, or Firm* — Stephen H. Hall; Jeremy A. Smith; Bradley Arant Boult Cummings LLP

(57) ABSTRACT

The present invention provides a system and method for constructing a complete definition of a backend requirements model that can be automatically accessed and interpreted, and generated into a mobile consumable API for creation of, and use with, mobile applications. The mobile consumable API can be provided and made available to mobile app developers on a separate, stand-alone platform, and may act as an intermediary between the mobile app and the primary mainframe/enterprise/back end system. The method may include identification and definition of one or more of information providers, integration providers, and system behaviors, and creating a domain model. The domain model may be automatically codified into an API based solution as the app/mainframe interface, and stored on a development and operational platform for use.

20 Claims, 5 Drawing Sheets

(56) References Cited

U.S. PATENT DOCUMENTS

2014/0282398 A1* 9/2014 Podolyak et al. ............ 717/121
2014/0282493 A1* 9/2014 Glover et al. ................ 717/176
2014/0366000 A1* 12/2014 Batabyal et al. ............. 717/120
2014/0366014 A1* 12/2014 Mair ............................ 717/177

* cited by examiner

SYSTEM AND METHOD FOR CREATING A DEVELOPMENT AND OPERATIONAL PLATFORM FOR MOBILE APPLICATIONS

CROSS REFERENCE TO RELATED APPLICATIONS

This application is a continuation of U.S. application Ser. No. 14/256,667, titled "System and Method for Creating a Development and Operational Platform for Mobile Applications," filed on Apr. 18, 2014, due to issue on May 19, 2015 as U.S. Pat. No. 9,038,015, which claims priority to U.S. Provisional Application Ser. No. 61/815,085, titled "Method for Developing Mobile Applications Integrating with a Mainframe or Large Computing System," filed on Apr. 23, 2013, the entire contents of all of which are herein incorporated by reference.

FIELD OF THE INVENTION

The invention relates generally to a system and method for creating a development and operational platform for mobile applications, e.g., computer software applications that can run on "mobile" devices, including but not limited to a smart phone or tablet.

BACKGROUND OF THE INVENTION

Many companies have existing enterprise or "backend" systems, sometimes also referred to as mainframe systems. Generally speaking, these enterprise systems represent the complex computer environment necessary to perform large scale enterprise computing. The environment may be represented by an individual, large scale computer or groups of smaller networked computers networked together to create a single instance of powerful computing capability. The enterprise systems often run large-scale application software packages that may support any number of analytics, processes, data reporting, and other functions in the business organization, including, as examples, enterprise resource planning (ERP) systems, inventory systems, or customer relationship management (CRM) software. The hardware for the enterprise systems often utilize various servers and storage media, and associated software, to manage large volumes of critical data, while maintaining high levels of data security and performance.

As technology has continued to develop, the market has continued to shift toward a desire for more mobile applications that can be integrated with existing such legacy systems, but utilized directly on mobile devices, like a smart phone, tablet, or other "mobile" device. Unfortunately, enterprise systems that organizations have traditionally relied upon are not easily integrated with mobile applications. Organizations that want mobile device software applications, or apps, that can tap into, read to/from, and/or interact with such systems have to invest significant time and resources to build the necessary software and application programming interfaces (APIs) to access such systems for a single mobile app. Such development can take months, and in some cases years, of complex developer work to connect mobile devices to legacy systems.

Specific mobile apps require extensive software development to implement the various functionality and features of a particular desired app. For example, an app may want to interact with Facebook, interact with one or more databases of a mainframe/enterprise/back end system, each having individual drivers and protocols, require specific user authentication, and follow certain security protocols. All of these features and functionalities must be individually developed, configured, and integrated. These same difficulties may exist even if not accessing or interacting with mainframe/enterprise/backend systems.

Development of the mobile app often includes defining the desired functionality of the app, capturing points of information, capturing points of integration, capturing system behaviors, each discussed in more detail below. This is traditionally done through a manual review and analysis by the app developer, and often in conjunction with the owner/operator of the mainframe/enterprise/back end system. Once the functionality, points of information, points of integration, and system behaviors are understood, an app developer can start the actual software development, which can be a very time-intensive and expensive process. The eventually developed app will reside on the mobile devices, but often interacts with the mainframe/enterprise/back end system through code residing on the same mainframe/enterprise/back end systems. Alternatively, the app may interact through an "intermediary" system, or middleware, i.e., a server application stored in a "server farm", which interacts with the mainframe/enterprise/back end system.

The one-off, project-based solutions that have traditionally be implemented have become unsustainable for many users. The industry does not currently have systems or methods for cost-effectively defining such mainframe/enterprise/backend systems, comprised of disparate data sources, that results in a single, consumable standard API complying with open specifications.

SUMMARY OF THE INVENTION

In one embodiment, the present invention relates to a method for creating a development platform for mobile device applications interacting with a mainframe computer system comprising: (a) providing a preconstructed computer code set of connectors for a first set of information providers, first set of integration providers, and a first set of system behaviors; (b) defining a second set of information providers with which the mobile device application will interact; (c) defining a second set of integration providers with which the mobile device application will interact; (d) defining a second set of system behaviors of the mobile device application; (e) creating a machine readable domain model from the second set of information providers, second set of integration providers, and second set of integration providers; (f) processing the domain model using a domain model processor to generate a mobile device application/mainframe interface having app specific connectors associated the second set of information providers, second set of integration providers, and second set of system behaviors, and wherein said app specific connectors are derived from the first set of information providers, first set of integration providers, and first set of system behaviors; and (g) storing the mobile device application/mainframe interface on a development and operational computer system platform.

In another embodiment, the present invention relates to a method for interfacing mobile device applications with a mainframe computer system comprising: (a) creating a machine readable domain model defining at least one information provider with which the mobile device application will interact, at least one integration provider with which the mobile device application will interact, and at least one system behavior of the mobile device application; (b) processing the domain model using a domain model processor to automatically generate a mobile device application/mainframe interface having at least one app specific connector associated the at least one information provider, at least one integration provider, and at least one system behavior, and wherein said at least one app specific connector is derived from a preconstructed computer code set of generic connectors associated with said at least one information provider, at least one integration provider, and at least one system behavior; and (c) storing the mobile device application/mainframe interface on a development and operational computer system platform.

In another embodiment, the present invention relates to a computer system for generating a mobile software application/mainframe computer system interface comprising: (a) memory storing a preconstructed computer code set of connectors for a first set of information providers, first set of integration providers, and a first set of system behaviors; (b) logic configured to process a preconstructed machine readable domain model defining a second set of at least one information provider with which the mobile software application with interact, a second set of at least one integration provider with which the mobile software application will interact, and a second set of at least one system behavior of the mobile software application to generate the mobile software application/mainframe computer system interface having app specific connectors associated with the second set of at least one information provider, second set of integration provider, and second set of system behavior, and wherein said app specific connectors are derived from the first set of information providers, first set of integration providers, and first set of system behaviors.

In some aspects, the invention relates to a system and method that automatically generates the necessary APIs, connections, and specific code base for defined mobile applications and mainframe/enterprise/backend systems.

In other aspects, the invention relates to a system and method that connects mobile devices to legacy systems of record, effortlessly and securely.

In other aspects, the invention relates to a mediator system between mobile devices and existing systems of record, allowing them an unbroken line of communication in real time.

In other aspects, the invention relates to a system and method, and software framework, for a coherent assembly of components to compose a functional system of mobile devices that interface to a mainframe/enterprise/backend system.

In other aspects, the invention relates to a platform designed for heavy-duty enterprise environments, and can be deployed on-premise, behind the firewall, integrating tightly with security policies, or live in the cloud to eliminate onsite infrastructure needs.

In other aspects, the invention relates to APIs that are immediately usable, so there is no need to remove and replace the middleware technologies that are already in place or disrupt the stable environment of existing systems of record.

In other aspects, the invention relates to a development platform that is owned and controlled by the enterprise, so they can retain complete control and not solely rely on vendors.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims. Additionally, while much of the description herein relates to mobile apps that interact with mainframe/enterprise/back end systems, the invention is equally applicable to mobile apps that do not interact with such systems.

The present invention provides a system and method for constructing a complete definition of a backend requirements model that can be automatically accessed and interpreted, and generated into a mobile consumable API for creation of mobile applications. The mobile consumable API can be provided and made available to mobile app developers on a separate, stand-alone platform, and may act as an intermediary between the mobile app and the primary mainframe/enterprise/back end system.

Figure 1:
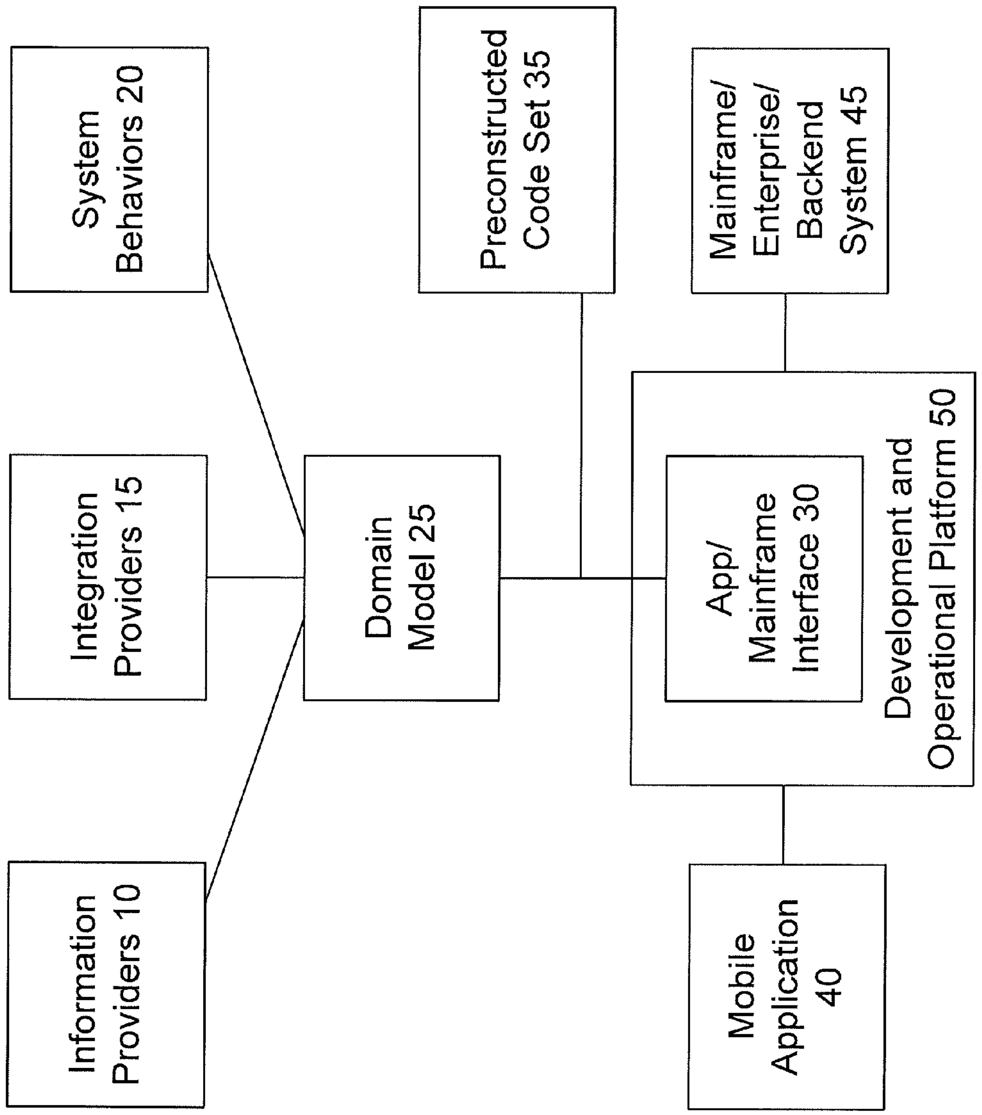
FIG. 1 shows the overall architecture of one embodiment of the present invention.

Referring to FIG. 1, in one of the most basic embodiments, the method comprises identifying, capturing, and defining the information providers 10, integration providers 15, and system behaviors 20, defining/creating an domain model 25, and automatically codifying the domain model 25 into an API based solution as the app/mainframe interface 30. The app/mainframe interface 30 can be stored on a development and operational platform 50, which allows further development by the app developer and/or the necessary interface between the mobile app 40 and mainframe/enterprise/back end system 45 during operation. In one embodiment, the development and operational platform 50 is comprised of one or more computer systems that may act as a web server, message broker, database, and perform other process, and may be, as an example, running a LINUX AMD64 instance, but can be any similar type of infrastructure known to those of skill in the art. The development and operational platform 50 contains memory for storage of the app/mainframe interface 30, optional databases which may be created or used by the app/mainframe interface 30, and optional custom developed code (as discussed below), as well as the necessary processors and logic for implementation. To create the app/mainframe interface 30, the method can reuse computer code from a preconstructed code set 35 comprised of specific computer code bases, or libraries, designed to provide the necessary connections, features, and functionality (identified/captured/defined from the information providers 10, integration providers 15, and system behaviors 20) to allow interaction between the mobile application 40 and mainframe/ enterprise/back end system 45.

Depending on the implementation, and the needed connections, features, and functionality from the preconstructed code set 35, the app/mainframe interface 30 may use computer code from the preconstructed code set 35 in unaltered form, and/or the preconstructed code set 35 may be "modified" and/or used to create the specific connection, feature, and/or functionality for the app/mainframe interface 30. For example, some code in the preconstructed code set 35 may be application "agnostic", and can be used by a variety of apps as is, without any additional configuration, changes, or modifications. Alternatively, some of the computer code in the preconstructed code set 35 is more generic in nature, and must be "configured", or modified, in order for them to be used in the app/mainframe interface 30 for a particular app.

The preconstructed code set 35, for example, may include computer code for a generic connector for a particular type of database (e.g., an Oracle® database), but without specific information about the location of the database, the credentials needed to access it, etc. As the app/mainframe interface 30 is created from the domain model 25, the generic connector in the preconstructed code set 35 may be automatically configured, or modified, to create the code set for a specific connector needed for the app 40, referred to herein as "app specific connector". In this example, the generic Oracle® database connector from the preconstructed code set 35 is converted to an app specific connector to a specific database, for example, one having a particular IP address, credentials, and target data name (as defined by the domain model 25). As used herein, the term "app specific connector" refers to the specifically configured/modified computer code for use in the app/mainframe interface 30, and generated from the preconstructed code set 35 based on the information provided in the domain model 25. While the term "connector" is used as part of the phrase "app specific connector", it will be recognized by those of skill in the art that such specifically configured/modified computer code may not be limited to a "connector", e.g., it also applies to the various features, functionality, etc. referred to herein. Thus, in some embodiments, the app/mainframe interface 30 may comprise computer code directly from the preconstructed code set 35 in unaltered form and/or app specific connectors. Thus, in some embodiments, the preconstructed computer code set 35 may provide unmodified, or generic, connectors related to a first set of information providers 10, a first set of integration providers 15, and a first set of system behaviors 20, while the app specific connectors provide a second set of connectors related to a second set of information providers 10, second set of integration providers 15, and a second set of system behaviors 20. In this context, the "first set" and "second set" do not normally represent different information providers 10, integration providers 15, and system behaviors 20, but rather represent unmodified/generic connectors v. app specific connectors derived from the domain model 25.

In some instances, a particular portion of the preconstructed code set 35 will be used to create one or more app specific connectors. For example, a particular implementation may include 3 separate Oracle® databases. Thus, the computer code for a generic connector to the Oracle® database can be used from preconstructed code set 35 to create an app specific connector for each particular Oracle® database. The app specific connector for each database will normally have different IP addresses, but may or may not have the same credentials, target data name, etc., all of which can be defined by the domain model 25.

Additionally, and again depending on the implementation, the development and operational platform 50 may contain all the computer code from the preconstructed code set 35 and/or app specific connectors, or it may contain only those portions of the preconstructed code sets 35 and/or app specific connectors for those connections, features, and functionality needed for the app/mainframe interface 30 for a particular app 40. For example, in one implementation, if only Oracle® databases are used, the non-Oracle® data source connections may be excluded from the development and operational platform 50. Alternatively, in another implementation, the entirety of the preconstructed code set 35 and/or app specific connectors may be made available to the app developer on the development and operational platform 50. In this latter case, portions of the preconstructed code set 35 may reside on the development and operational platform 50, but may simply be unused by the specific app 40.

The preconstructed code sets 35, the app specific connectors, and the app/mainframe interface 30 are preferably stored on the development and operational platform 50 in compiled computer code format, but can also be provided in other formats as desired.

With continuing reference to FIG. 1, identifying, capturing, and defining the information providers 10, may include (a) capturing points of data source; (b) capturing points of messaging; and (c) capturing points of logic execution. Identifying, capturing, and defining integration providers 15 may include (a) capturing points of advertising; (b) capturing points of commerce; and/or (c) capturing points of social. Identifying, capturing, and defining system behaviors 20 may include may include (a) capturing points of performance; (b) capturing points of analytics; (c) capturing points of security; and (d) capturing points of quality.

The steps involving identifying, capturing, and defining information providers 10, integration providers 15, and system behaviors 20 are discussed in more detail below, and generally refer to the process of identifying the necessary components, features, functionality, and requirements to allow a mobile device, running a mobile app 40, to properly interface with a defined mainframe/enterprise/backend system 45. It should be recognized that while each category (e.g., information providers 10, integration providers 15, and system behaviors 20) is discussed with various subcategories, the various subcategories are not necessarily tied to the primary categories, and an individual developer may include one or more of the subcategories with a different primary category. Additionally, depending on the particular mobile app 40 being developed, and the mainframe/enterprise/back end system 45 with which it will interact (if at all), one or more of the categories, or subcategories may not be relevant to a particular development effort. Moreover, app developers may include one or more categories, or subcategories, not specifically discussed herein, but that are known to those of skill in the art, and the example categories, and associated subcategories, discussed in more detail below are not intended to be limiting.

Figure 2:
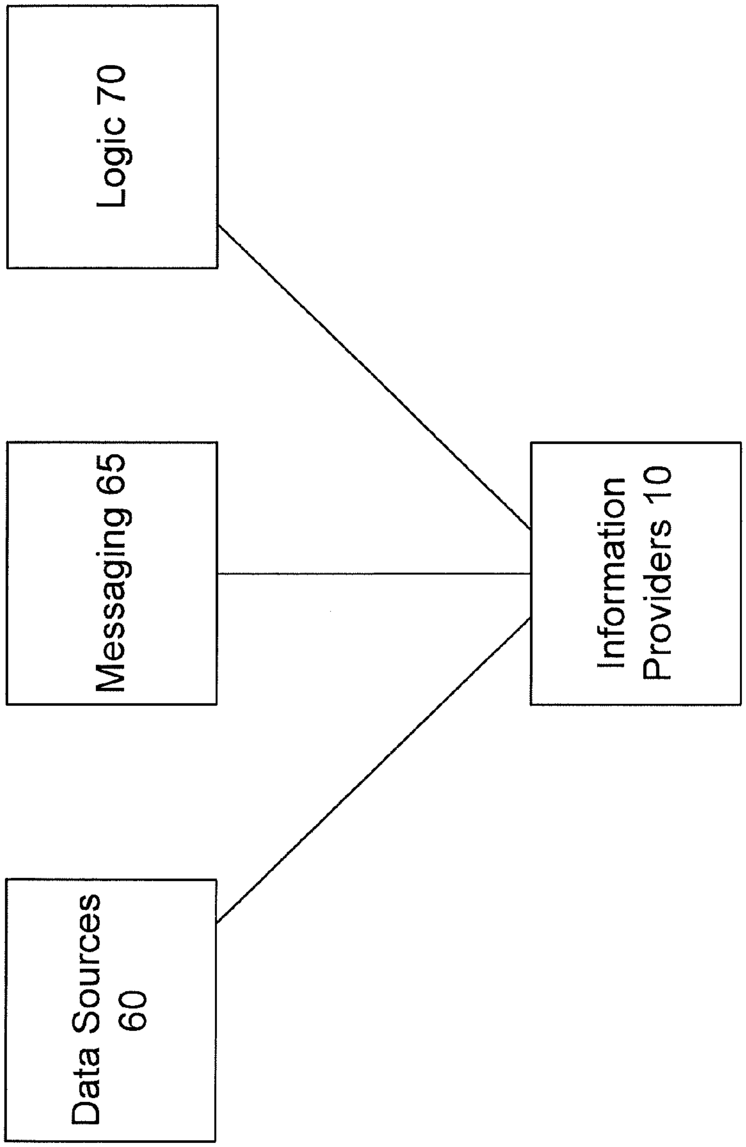
FIG. 2 shows the various, optional inputs/analysis for information providers in accordance with one embodiment of the invention.

Referring to FIG. 2, identifying, capturing, and defining information providers 10, may include (a) identifying, capturing, and defining points of data source 60; (b) identifying, capturing, and defining points of messaging 65; and (c) identifying, capturing, and defining points of logic execution 70. Each is discussed in more detail below.

Information Provider—Points of Data Source

Among other aspects, app developers seeking to interface a mobile device to a backend system must identify, capture, and define the various sources of backend (or mainframe/enterprise system) data sources 60 that the mobile application 40 will interact with, for example, to query, receive data from, and/or create, modify, delete, or store data. An example of this may be the data store in a product inventory that must be viewed, added to, modified, or removed to manage the live state of a warehouse. Many possible data sources 60 exist, but may include, but is not limited to:

- Relational Databases that honor typically defined SQL as their language of access—IBM DB2, Oracle Database, Microsoft SQLServer, MySQL, Post
- File based data sources—VSAM, QSAM, BPAM, VSAM, OAM, ISAM, DB2 for System i
- Heirachical—IMS
- Human readable file XML, CSV, YAML, SOAP
- NoSQL Databases—Mongo, CouchDB, Cassandra
- Database as a Service (DBaaS)—Cloudant, DynamoDB, Heroku, Microsoft SQL Azure, GaianDB, EnterpriseDB, ClearDB
- MBaaS Data source—ClearBlade, Parse, Kinvey, FeedHenry
- Standards based—OData Each data source 60 may have specific drivers and/or protocols that must be followed to interact with the data source 60. For example, Oracle® provides a driver and the protocol to use an Oracle®database. Developers then have to write a specific code base to use the driver using Oracle®'s protocol. Even for data sources that do not use a specific driver, app developers will normally have to write specific code to read from/write to a particular data source 60, often with each different data source 60 having its own specific implementation.

In the present invention, specific computer code (or logic) is written to create, read, update, delete, etc., each specific type of data source 60 (or, if available, pre-existing computer code sets already created can be used), and populated in the preconstructed code set 35. Thus, there can be a specific software implementation to interact with an Oracle®database, using the Oracle®driver/protocol, a specific computer code base to interact with a Microsoft SQLServer database, using the Microsoft driver/protocol, etc. Preferably, the preconstructed code set 35 contains the necessary code to interact with all of the industry standard data sources and associated protocols. As discussed further below, having the preconstructed code set 35 allows the app/mainframe interface 30 to be automatically generated from the domain model 25.

Though each data source 60 may require slightly different input parameters, the metadata for interacting with a particular data source 60 may include: (1) destination server inputs such as IP address, listening port(s); (2) credentials to access; (3) target data name such as table name, id or filename; and (4) internal settings such as access keys and secrets. Other input parameters may be required depending on the nature of the data source 60, and would be known and understood to those of skill in the art.

Information Provider—Points of Messaging

Another aspect that developers must account for is messaging 65 utilized in a mobile app 40 and/or mainframe/enterprise/back end system 45 with which it will interact, e.g., the types of messaging and associated message sources 65. Messaging 65 includes any provider that can conceptually send a message to recipients enrolled in a software infrastructure, and may include:

- Message Oriented Middleware—brokers or queue software complying with the following possible specifications including but not limited to MQTT, AMQP, XMPP, WebSockets, SignalR, JMS, MQI, and AMI;
- Email—possible specification providers including but not limited to SMTP, IMAP, and POP3;
- Mobile Vendor based notification systems including but not limited to: Apple IOS Push Notification, Google Android Messaging, Blackberry Messaging, Windows, Mozilla, Nokia, SMS, and MMS;
- Message services protocols including but not limited to WhatsApp, Facebook Messenger, and GoogleTalk;
- Chat Specific protocols including but not limited to Jabber, and IRC;
- Realtime communication based protocols including but not limited to WebRTC and Jingle;
- Sensor based protocols, for example, MQTTSN COAP, and WSN.

For example, to utilize Apple IOS Push Notification as the messaging for a particular app, Apple will provide an API that specifies how to implement and use that functionality. Thus, an app developer seeking to implement a mobile app that utilizes Apple IOS Push Notification will use the Apple API to do so. Other vendors may likewise have specialized APIs to interact with their messaging systems. Other messaging functionality may implement or utilize other industry standard APIs.

It is not uncommon for a particular mobile app 40 to use a particular messaging specification, for example, MQTT. However, older mainframe/enterprise/back end systems 45 may use more traditional middleware that uses something like JAVA Messaging Service (JMS) API. In this circumstance, app developers have to write a specific code base to convert messages using one protocol to another, e.g., provide the ability for the mainframe/enterprise/back end messaging protocol to "interpret" the message. For example, the app 40 may send a message following the MQTT specification, which must then be converted to JMS, which can then be sent, received, and interpreted by the mainframe/enterprise/back end system 45, be processed, and then sent back in JMS, and converted to MQTT specification so it can be properly received, interpreted, and used by the mobile app 40.

In the present invention, specific computer code, or libraries, are written to use each specific type of messaging/message source 65 (or, if available, pre-existing computer code sets already created can be used), and populated in the preconstructed code set 35. The preconstructed code set 35 can also be populated with specific libraries bases to interpret and convert messages using different specifications, e.g., MQTT/JMS. Preferably, the preconstructed code set 35 contains the necessary code to implement all of the industry standard messaging specifications. As discussed further below, having the preconstructed code set 35 allows the app/mainframe interface 30 to be automatically generated from the domain model 25. It should be noted that throughout the specification, applicant generally uses the term "computer code" to refer to the logic designed to be run, interpreted, and executed on computer systems. In various places, additional terms like "library" or "connector" are also used in the context of the particular aspects of the invention, all of which are computer code.

Though each message source 65 require slightly different input parameters, the metadata for each may include: (1) destination server inputs such as IP address, listening port(s); (2) credentials to access; (3) messaging protocol details; and (4) internal settings such as access keys and secrets.

Information Provider—Points of Logic Execution

With continuing reference to FIG. 2, in addition to identifying, capturing, and defining data sources 60 and points of messaging 65, app developers must also identify, capture, and define desired logic execution 70. The logic execution 70 generally refers to the processes and procedures that are implemented by the mainframe/enterprise/back end system 45. For example, it may be a product inventory system for a warehouse, or a medical application that helps doctors diagnose medical conditions based on certain patient symptoms. Logic execution 70 includes the ability to provide inputs to a remote process running on the mainframe/enterprise/back end system 45, allow time for the inputs to be understood and provide a set of outputs unique to the logic executed. This logic can possible maintain state from execution or can be stateless. This logic has the ability to maintain state across multiple calls from the mobile devices, e.g., the logic is able to store and recall the username from previous calls when attempting to get the users checking account balance so that login steps are not required each time.

Execution of logic 70 can be achieved through software protocols, standards and framework like but not limited to:

- Web Services, for example, REST and SOAP;
- Remote Procedure Calls—Possible implementations of RPC include but not is limited to RPC-JSON, RPC-WS, CORBA, Java RMI, Windows Communication Foundation, Open Network Computing (ONC), and Distributed Computing Environment (DEC);
- Transaction Servers, for example, CICS, TPF, SABRE, IMS, and TxSeries;
- Data Streams, for example 5250, 3270, and Telnet;
- Enterprise API/ESB, in the "cloud" using, as examples, Level 7, Apigee, or MuleSoft, or vendors, such as Saleforce, CastIron, WebSphere, or TIBCO.

Particular logic execution 70 that may be desired may not reside in the mainframe/enterprise/back end system 45, but rather may be included as part of the app/mainframe interface 30 on the development and operational platform . For example, the mainframe/enterprise/back end system 45 may include databases in a financial institution that separately house customer savings account balances and checking account balances. An app developer may want to allow a customer to query the databases to return an overall balance (savings account plus checking account). A developer can either design and code logic execution 70 to add the savings account balance and checking account balance, and return a total balance figure to the customer, in the mainframe/enterprise/back end system 45, as part of the app 45, or as in the present invention, it can be included in the development and operational platform 50. By including in the development and operational platform 50, it can minimize the chances of disrupting the functionality of the mainframe/enterprise/back end system 45, and decrease the amount of data sent to, and processing by, the mobile application 40.

In the present invention, specific computer code bases are written for commonly used logic execution 70 (or, if available, pre-existing computer code sets already created can be used), and populated in the preconstructed code set 35. Preferably, the preconstructed code set 35 contains the necessary code to implement industry standard logic execution 70. As discussed further below, having the preconstructed code set 35 allows the app/mainframe interface 30 to be automatically generated from the domain model 25. While the preconstructed code set 35 preferably contains extensive options for logic execution 70, it should be understood that each individual mobile app 40 and mainframe/enterprise/back end system 45 may still require custom developed code for desired logic execution 70. Such custom development can be implemented on the development and operational platform 50, either as part of the app/mainframe interface 30, or as separate code and functionality, but run on the development and operational platform 50.

Figure 3:
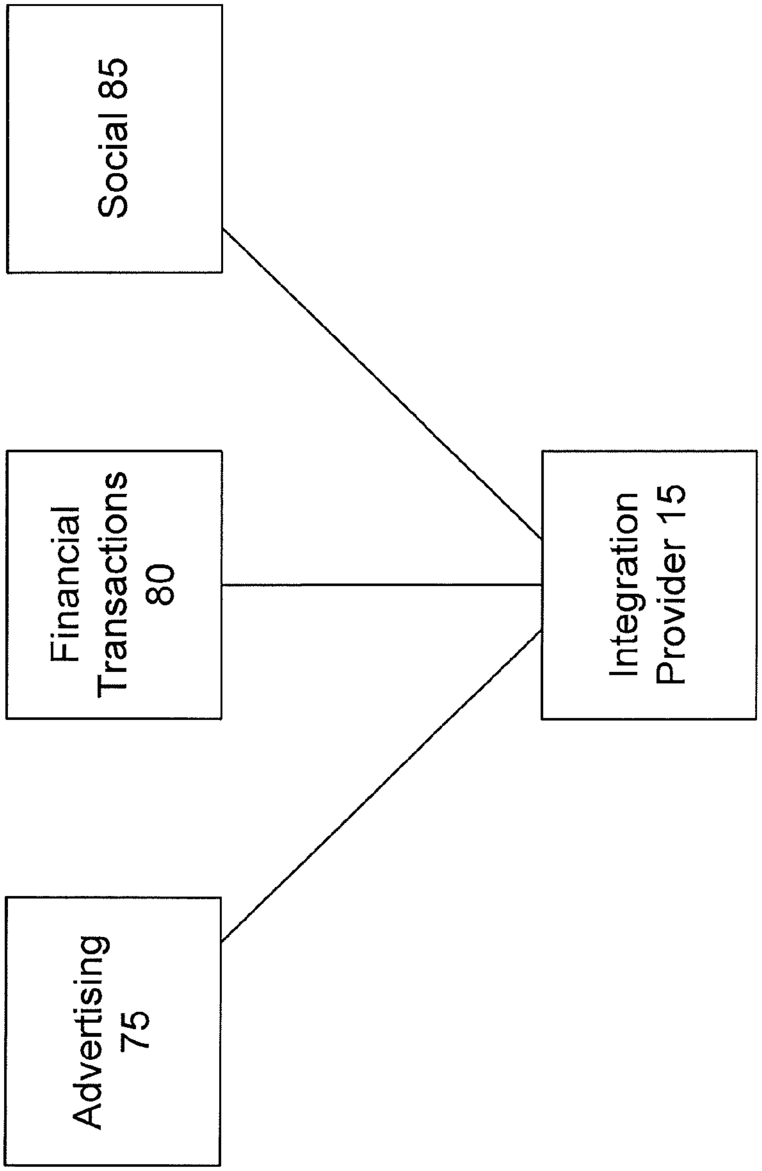
FIG. 3 shows the various, optional inputs/analysis for integration providers in accordance with one embodiment of the invention.

Referring to FIG. 3, in addition to identifying information providers 10 for particular mobile apps, a developer may have to identify, capture, and define integration providers 15, which may include (a) advertising 75; (b) financial transactions 80; (c) social interaction 85, each of which is discussed further below.

Integration Provider—Points of Advertising

Developers need to understand, and account for, what aspects are needed for the mobile app 40 to incorporate the desired content for advertising 75, if any. Depending on the nature of the app 40, no advertising content may be desired or needed. For other apps 40, however, the developer may want to include various types of advertising media known in the industry, including by not limited to banner ads, popup ads, or audio/visual ads that may interrupt the functionality of the app 40 while being played, etc. The developer may also want to comply with the content management interoperability services (CMIS) standard, and/or to include sensory or contextual information that may consist of geolocation functionality (i.e., the location of the mobile device), time of day (e.g., the time of day that a mobile device interacted with the backend system 45), and/or response to content. The advertising functionality may also include, but is not limited to, the ability to interrupt interaction flow, insert advertising material to existing communication, and/or provide behavior information to third party entities (e.g., what advertisements were viewed, what separate content may have been accessed by the user, etc.).

In the present invention, specific computer code bases are written for commonly used advertising/advertising functionality and standards 75 (or, if available, pre-existing computer code sets already created can be used), and populated in the preconstructed code set 35. Preferably, the preconstructed code set 35 contains the necessary code to implement industry standard advertising/advertising functionality and standards 75, e.g., code for banner ads, pop up ads, audio/visual ads, APIs to advertising content providers, user behavior information, etc. As discussed further below, having the preconstructed code set 35 allows the app/mainframe interface 30 to be automatically generated from the domain model 25.

Integration Provider—Points of Commerce

Some apps may need the ability to register financial transactions 80. Thus, a developer will need to identify if functionality is needed to register financial transactions, for example, between one or more of business(es), government, and/or consumers, and if so, capture and define the needed components, features, functionality, and requirements. Typical types of financial transactions may include monetary exchange, bill of lading, contract signature, work order, change request, statement of work, financial currency exchange, and investment profile. Apps 40 that include the ability to register financial transactions 80 may also trigger additional security requirements. For example, an app 40 that includes monetary exchange may require more security requirements (e.g., encryption), where apps 40 that do not include any monetary exchange can utilize less stringent security requirements.

In the present invention, specific computer code libraries are written to implement and complete commonly used financial transactions 80 (or, if available, pre-existing computer code sets already created can be used), and populated in the preconstructed code set 35. This could include the mobile app's ability to interact with a check clearing system to appropriately transfer currency between account holders. As discussed further below, having the preconstructed code set 35 allows the app/mainframe interface 30 to be automatically generated from the domain model 25.

Integration Provider—Points of Social

Mobile app developers may also want to incorporate functionality for social interaction 85. This may include the ability to both gather data from, and post information to, social networks, for example, Facebook, LinkedIn, Google+, or a variety of other "social" platforms. Possible social interaction points include user authentication and profile data, system interaction posts to social profiles, and social data to drive end user presentation. For example, a particular app 40 may provide for a user's Facebook ID to log on to the app 40.

As another example, a particular app 40 may be designed for a large retailer for use by its customers. The retailer wants to allow its customers to post messages to their social network page when they went shopping at the retailer, and what they bought. Thus, the app 40 may provide the ability for the users to log on to the app 40 using their Facebook ID and password. The app 40 may also include geolocation functionality to determine what store location the user is in when they log on, to automatically determine what the user purchased, to allow the user to post a message to their social profile, perhaps with something like "I just purchased 2 pillows from XYZ on Main Street". In this example, the app 40 must not only have the specific code base for the desired user interface and functionality, but it must also properly access and utilize the social network API for interacting with the social network.

In the present invention, specific computer code bases are written to implement commonly used social interaction 85 (or, if available, pre-existing computer code sets already created can be used), and populated in the preconstructed code set 35. For example, the Facebook API can be provided, as well as specific computer code bases for using a social network log in and password as the log in and password for the app, geolocation functionality, and allowing users to post comments to their social network pages. As discussed further below, having the preconstructed code set 35 allows the app/mainframe interface 30 to be automatically generated from the domain model 25.

While the foregoing disclosure has focused on advertising 75, financial transactions 80, and social 85, there are other points of integration known to those of skill in the art, and the present invention is equally applicable and usable in other implementations. Without limitation, other points of integration can include, but is not limited to, analytics services (e.g., Google's analytics services), healthcare frameworks (e.g., healthcare applications and healthcare specific implementations and security requirements), supply chain systems, inventory management systems, and energy grid platforms, just to name a few.

Figure 4:
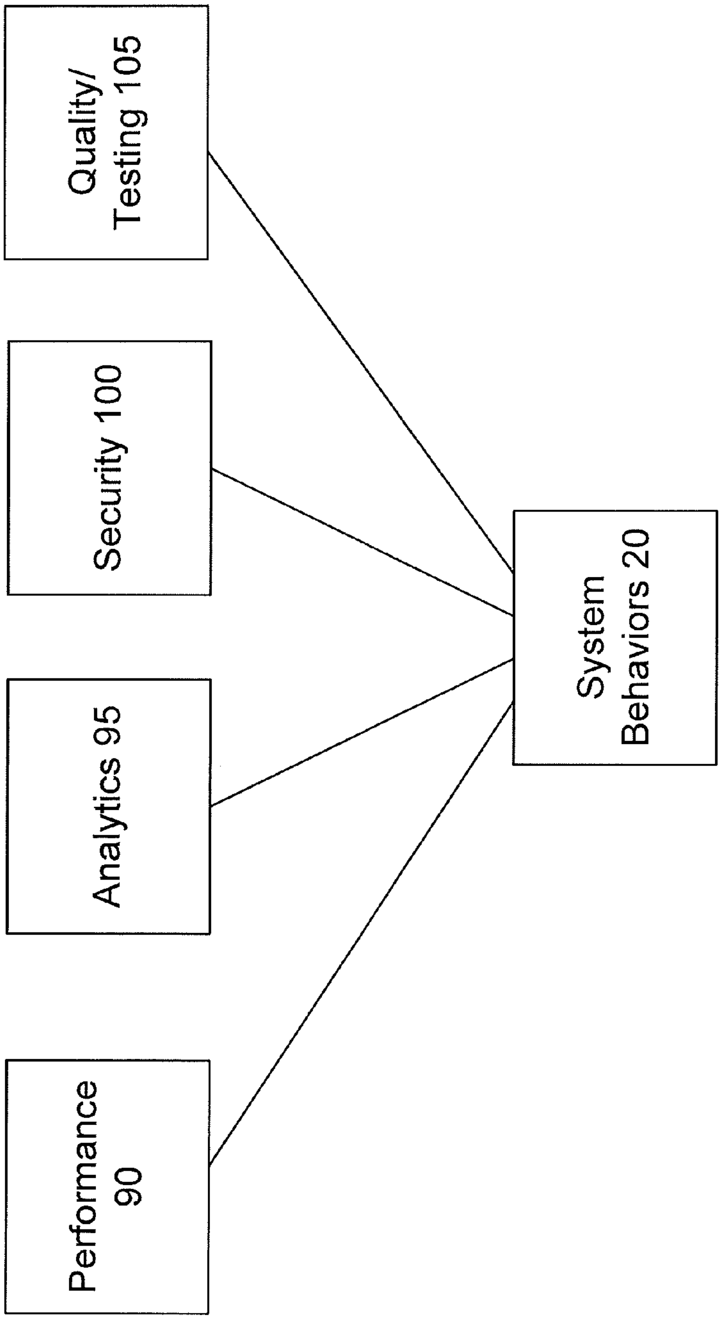
FIG. 4 shows the various, optional inputs/analysis for system behaviors in accordance with one embodiment of the invention.

Referring now to FIG. 4, in addition to information providers 10, and integration providers 15, mobile app developers need to identify, capture, and define system behaviors 20, which may include (a) performance 90; (b) analytics 95; (c) security 100; and (d) quality/testing 105. Each of the foregoing is discussed in further detail below.

System Behaviors—Points of Performance

For each point of information, logic, and integration, required performance 90 is preferably identified, captured, and defined. This information can be used to measure and possibly enforce Service Level Agreements (SLAs) or if possible affect the instantiation of the resulting model. The performance criteria 90 may include any of the standard performance criteria known to those of skill in the art, including but not limited to (a) expected response times by system endpoint(s); (b) concurrent access requirements by system endpoint(s); and (c) expected downtimes or windows when system endpoint(s) are expected and/or allowed to be unavailable.

In the present invention, specific computer code bases are written to implement, track, store, and report commonly used performance criteria (or, if available, pre-existing computer code sets already created can be used), and populated in the preconstructed code set 35. This might include the ability for an app 40 to make 500 calls per second and get a guaranteed response time of 500 ms when requesting a current inventory. As discussed further below, having the preconstructed code set 35 allows the app/mainframe interface 30, having these features and functionality, to be automatically generated from the domain model 25.

System Behaviors—Points of Analytics

The mobile app developer also needs to identify, capture, and define desired analytics 95 for the mobile app 40. The analytics 95 represent possible information valuable to an entity, which can lead to better user experience, high user interaction, higher revenue generation, better device performance, better back end performance, and defect identification. The various analytics 95 desired by a particular app will be dependent on the type of app being developed, and are well understood by those of skill in the art.

Examples of optional analytics 95 for a particular mobile app 40 to track, store, and/or report may include (a) identifying criteria of end users (e.g., end users profile name and address, current GPS location, device type (iPhone 4s) and average usage time); (b) data accessed and modified by end users (e.g., end users accessed the inventory for part no. XXXXX, and reduced the inventory by 1); (c) messages received and sent by end users (e.g., end user sent a request to the enterprise system at 10:50 AM on Mar. 13, 2014, and received a response at 10:51 AM on Mar. 13, 2014); (d) logic executed and reviewed by end users (e.g., end users types of financial transactions performed like 56 withdrawals and 12 deposits); (e) location of interaction (e.g., transaction HELO executed on IBM zOS CICS 4.3); (f) timestamp of interaction (e.g., interaction occurred at 10:58 AM on Mar. 14, 2014); (g) speed of interaction (e.g., interaction took 1.24 sec); (h) system state at time of interaction (e.g., system was batch processing end of day inventory); (i) frequency of interactions (e.g., there were 50 interactions over a 24 hour period); (j) device interaction points of touch (e.g., the user tapped the search button 72 times and used the advanced query icon 23 times for performance of the product lookup action).

The various analytics monitoring can produce alerts, notices, triggers, and/or changes in system accessibility or functionality that can be sent via any of the optional points of messaging 65 listed above. These analytics can also be stored in one or more databases in the mainframe/enterprise/back end systems 45, or the development and operational platform 50, for review and analysis. These alerts, notices, triggers, and or changes can include things like usage limitations reached (e.g., only 10 users are permitted to access the system at any one time), specific user access, and suspicious activity.

In the present invention, specific computer code bases are written to implement, track, store, and report commonly used analytics 95 (or, if available, pre-existing computer code sets already created can be used), and populated in the preconstructed code set 35. For example, specific computer code bases can include functionality to track and report when a data source was accessed, where the interaction occurred, and the messages sent/received by users. As discussed further below, having the preconstructed code set 35 allows the app/mainframe interface 30 to be automatically generated from the domain model 25. The specific computer code bases can also include functionality to define and create separate databases for tracking and storing the analytics.

System Behaviors—Points of Security

The mobile app developer also needs to identify, capture, and define desired security requirements 100 for the mobile app 40. Some apps 40 may be accessing, reading to/from, or interacting with backend systems 45 that are, and need to remain, secure, while other apps 40 may not have high levels of security needed. Security requirements 100 may include further subcategories of transmission of information, storage of information, end user authentication, end user authorization access, external data source authorization control, and network gateway interaction, each of which are discussed further below.

Transmission. One aspect of this step is to identify the transmission protocol for data to/from mobile applications 40, and mainframe/enterprise/back end systems 45. The transmission protocol is often driven by the integration points available function but can also be influenced to use the "best available" when considering security. For example, a telnet based integration may use secure shell—5514, Simple Authentication and Security LayerSASL or Transport Layer Security—TLS.

For mobile devices, this step may include identifying and understanding the transport process for sending/receiving data from the defined backend 45 to the mobile smart device or connected device. This can include no encryption or a common standard for SSL. Additional, optional, security models could include using a "centralized" approach, e.g., SSL, DNSSEC, Convergence, or TLS, or a "de-centralized" approach, e.g., PGP, Open PGP, or GnuPGP.

Storage. The identification, capture, and definitions relating to the storage of information is another step often utilized by mobile app developers. Backend systems 45 and passthrough mobile devices will often store data for two types of categories, namely metadata and intermediate storage, and for each category, the security requirements will preferably be documented. As for metadata, the data about the system is preferably secure. This is often persistent data which may be stored in a file system or database. Potential metadata may include, as examples, definition of (a) data structures used; (b) end user registries; (c) security models; (d) code logic; and (e) integrations to third party systems. Options for securing this data include, as examples, file system data encryption and/or read/write privilege management of the file system.

As for intermediate storage, this preferably includes the ability to store data of the file system persistently as flat files, database files, memory options, or other methods to those known to those of skill in the art. For security, this data preferably includes the ability to encrypt and/or manage access permissions.

End User Authentication. End user authentication is another feature/functionality that may be important to a particular mobile app 40. For any data to be exposed to mobile devices and sensors, an authentication model is preferably established. This user registry can be captured and defined for integration and implementation purposes. Different categories of authentication can exist to support disparate usage models. These different authentication models include, but are not limited to, (a) system, (b) device, (c) application, and (d) user. Optional solutions for authentication models include, but are not limited to, (a) flat file, (b) custom user registry, (c) operating system, (d) LDAP/MS Active Directory, (e) social registries (e.g., Facebook), (f) RACF, (g) single sign on (SSO), (h) OAuth, and (i) Security Assertion Markup Language.

End User Authorization Access. End user authorization access is another feature/functionality that may be important to a particular mobile app 40. Each available function and data source 60 within the defined mainframe 45 to mobile app 40 system has the potential for specific authorization. These authorizations could be set specifically for a user or can generically be defined in a set sometimes called a role, e.g., an "administrator" role has broader access than a specifically defined "user" role. When identifying, capturing, and defining end user authorization access, information that can be captured and defined includes, but is not limited to, (a) available roles; (b) role accesses and authorities to information and integrations; (c) static defined users; (d) static user accesses and authorities to information and integrations; (e) default role assignments for users; and (f) management process for roles and users authorization.

External Data Source Authentication Control. Another step for a mobile app developer may include analysis of external data source authentication control. With each defined integration, data source 60 and software middleware, there is the possibility for a credential requirement. This credential must be understood and defined. The authorities associated with that credential should be captured, ensured, and stored. The security of the credential can be addressed by using those processes and procedures known to those of skill in the art, including but not limited to (a) encryption; (b) obfuscation ; or (c) protected by intermediate server-side authority, like the development and operational platform 50, or user registry.

Network Gateway Interaction. Yet another step a mobile app developer may include is analysis of the network gateway interaction. The network gateway interaction includes a capture and definition of the data being secured as it travels between different levels of network trust. Network trust levels to an organization can include but are limited to (a) private infrastructure not connected to internet; (b) private infrastructure connected to internet behind a firewall; (c) private infrastructure connected to the internet in a DMZ (demilitarized zone); (d) private infrastructure connected to the internet outside a firewall; (e) private cloud infrastructure connected to the internet provisioned behind a firewall; (f) public cloud infrastructure connected to the internet outside the firewall; (g) general network; (h) mobile device or sensor connected to a network behind a firewall; (i) mobile device or sensor connected to a network in a DMZ; and (j) mobile device or sensor connected to a network outside a firewall. Other network trust levels are known to those of skill in the art.

A mobile app developer may also need to understand and identify the asset location within the different levels of network trust. Each asset involved in the defined mobile system should have its relevant information identified and defined. Types of assets include, but are not limited to, (a) data sources 60—location, level; (b) message sources 65; (c) logic source 70; (d) integration source 15; (e) security registry sources 100; and (f) mainframe 45 (or backend system) to mobile implementation locations, e.g., development and operational platform 50. The information to be understood includes, but is not limited to, (a) level of confidence (can be defined by relevant industry standards like HIPAA, PCI), and (b) permanence of storage (disk, in memory, in application session, wire).

A mobile app developer may also need to understand and define the transfer between different levels of trust. This process may include identifying whether the mobile app 40 needs the ability to work with VPN and other mobile tunneling strategies. Possible points of integration include, but are not limited to, (a) Virtual Private Network client; (b) Mobile Application Management client; (c) Mobile Device Management client; and (d) Mobile Service Management client.

In the present invention, specific computer code bases are written to implement commonly used security requirements 100 (e.g., for transmission, storage, end user authentication, end user authorization access, external data source authentication control, and network gateway interaction discussed above, although other aspects may be included) (or, if available, pre-existing computer code sets already created can be used), and populated in the preconstructed code set 35. As one example, a medical device has permission to write data to a backend database but not modify it, the data is sent over SSL and when it is stored on the server, it is encrypted on the local filesystem. In this example, writing, but not editing, is handled using the security rules housed in the tools described under “End User Authentication”, e.g., RACF, Active Directory, etc. For other examples, specific computer code bases can include functionality defining available user roles, read/write privileges, encryption, and implementing various security protocols. As discussed further below, having the preconstructed code set 35 allows the app/mainframe interface 30 to be automatically generated from the domain model 25.

System Behaviors—Points of Quality/Testing

The mobile app developer also needs to identify, capture, and define desired points of quality/testing 105 for the mobile app 40. For example, for each tool, feature, or function that can be enabled by the mobile app 40 interacting with the mainframe or backend system 45, the developer may also want to provide testing functionality. For example, an app developer may provide an automated unit test that can be run at any time (for example using open source technology like Karma). These tests can be run on multiple devices after every change to the app 40 is made. This concurrent testing method means the mobile app 40 is tested frequently and will provide reassurance that the core functions of the app 40 will not fail. In addition to the core unit tests, a “test runner” can be used to run end-to-end tests to make sure the user will not experience any trouble using all the functions of the app 40 as a whole. These tests can be partially generated automatically for common scenarios but also users or developers can record scenarios. This can be done by actually interacting with the app 40 on the device and carrying out a set of tasks/functionality. The automated test would fail if these recorded tasks are not able to be completed on newer versions of the app. If any other custom tests need to be written, they can be done using the record method or by manually scripting the scenario into a test case. The quality measures can be captured and executed in the following order: (1) information providers 10 (a) data sources 60; (b) messaging 65; (c) logic execution 70; (2) integration points 15 (including social context 85); and (3) system behaviors 20. While other sequences are available, the foregoing sequence was found to be optimal. In this sequence, they build in functionality, there is no need to run subsequent tests if the prior ones do not succeed.

In the present invention, specific computer code bases are written to implement commonly used quality/testing requirements 105 (or, if available, pre-existing computer code sets already created can be used), and populated in the preconstructed code set 35. For example, a preconstruted test case can be written to ensure that an android application can read and update data contained in an external MySQL database when authorized as a general users. As discussed further below, having the preconstructed code set 35 allows the app/mainframe interface 30 to be automatically generated from the domain model 25.

While the foregoing analysis of information providers 10, integration providers 15, and system behaviors 20 can be done through a manual process, e.g., simply taking notes about the various features, functionality, and requirements of the app 40, and interaction between the app 40 and the mainframe/enterprise/back end system 45, the foregoing analysis can also be automated through a computer interface where an particular app developer can select from a number of menus and screens to choose and enter information about the app developer’s desired features and functionality, and interaction between the app 40 and the mainframe/enterprise/backend system 45. For example, there may be a menu to select one or more data sources that can be pre-populated with the possible data sources 60 discussed above, and for each data source, the app developer may be able to specify the various input parameters (as discussed above). Similar menus and capture screens can be used for the other features and functionality discussed above, including but not limited to, messaging 65, logic execution 70, advertising 75, commerce/financial transactions 80, social 85, performance 90, analytics 95, security 100 (including information storage, end user authentication, end user authorization access, external data source authentication, network gateway interaction, and quality/testing). The user selections can be stored in any standard computer readable format, and when processed by a specific processors, and predesigned logic, can automatically generate the domain model 25 for further processing. Doing so, would allow the result of such analysis to be automatically converted into the domain model 25 discussed further below.

Preconstructed Code Set

The specific computer code bases in the preconstructed code set 35 are preferably associated with a particular category, or subcategory, of the information providers 10, integration providers 15, and system behaviors 20. For example, one specific computer code base to interact with the Oracle®database, using the Oracle® driver/protocol, is associated with Oracle® databases, another specific computer code base to implement banner ads is associated with banner ads, another specific computer code base to make posts to Facebook® are associated with Facebook® posts, etc. Thus, as the domain model 25 is read and analyzed by the domain model processor 120 (discussed further below), and the various features and functionality as defined by the domain model 25 are interpreted, associated specific computer code bases can automatically be identified and populated into the development and operational platform 50 (if only portions of the preconstructed code set 35 are used), as part of the app/mainframe interface 30.

The preconstructed code set 35 may also have internally defined associations/relationships, where if one specific computer code base is requested or needed for the development and operational platform 50 (as defined by the domain model 25), other specific computer code bases are also populated to the development and operational platform 50 and/or app specific components created. For example, if the domain model 25 identified monetary exchange functionality as part of a financial transaction 80, but the domain model 25 did not separately identify any security requirements 100, the financial transaction 80 specific computer code base may be associated with one or more security 100 specific computer code bases, and those security 100 specific computer codes bases (including app specific connectors, as appropriate) may be automatically be identified and populated into the development and operational platform 50, as part of the app/mainframe interface 30.

While the preconstructed code set 35 preferably contains extensive options for industry standard connections, interfaces, interaction, features, and functionality with the information providers 10, integration providers 15, and system behaviors 20, as applicable, it should be understood that each individual mobile app 40 and mainframe/enterprise/back end system 45 may still require custom developed code for desired connections, interfaces, interaction, features and functionality (as was discussed above with respect to logic execution 70). Such custom development can be implemented and stored on the development and operational platform 50, either as part of the app/mainframe interface 30, or as separate computer code that interacts with the app/mainframe interface 30.

Creation of Domain Model

Traditionally, after software app developers understood the information providers 10, integration providers 15, and system behaviors 20, they would undertake the time-intensive process of actually writing the serverside and client side computer code for the app 40 and the necessary features, functionality, and interaction between the mobile app 40 and the mainframe/enterprise/back end system 45. This laborious process included writing the various computer code to access a particular data source, to implement a particular messaging protocol, to provide certain security functions, etc.

In one aspect of the present invention, once the information providers 10, integration providers 15, and system behaviors 20 are captured and defined, the domain model 25 is created. As discussed above, the domain model 25 can be manually generated, or automatically generated. Preferably, the domain model 25 is created in a computer readable format like, but not limited to, markup languages. This can include XML and with a well defined Document Type Definition (DTD). The structure of the domain model 25 will preferably follow the hierarchical path to understand and maintain the points of the information and integration. The domain model 25 preferably contains relevant information to the entirety of the backend solution such that document renderers can provide rich editing and software infrastructure that are capable of consuming and implementing, as discussed above. The domain model 25 is in a machine readable format that can be processed and analyzed using separate computer logic.

Without limiting the foregoing, the domain model 25 could include one or more of the following information for each data source 60: (1) destination server inputs such as IP address, listening port(s); (2) credentials to access; (3) target data name such as table name, id or filename; and (4) internal settings such as connection information or appkey/app secret. Similarly, the domain model 25 could include one or more of the following information for message sources 65: (1) destination server inputs such as IP address, listening port(s); (2) credentials to access; (3) messaging protocol details; and (4) internal settings such as appkey/appsecret. The domain model 25 can similarly include the details for the other categories, and subcategories described above.

The domain model 25 preferably provides the configuration information to create an instance of connection for the app 40 that is being built. As discussed above with regard to Oracle® database connections, the configuration information in the domain model 25 allows creation of the app specific connectors. As another example of an optional app specific connector, the domain model 25 can include configuration information for analytics 95. For example, if a user wanted to track how often the name "John Doe" was searched on a particular social network, the domain model 25 can provide the necessary configuration information to generate an app specific connector to track, flag, and report that, essentially creating a new analytic "rule" or "filter" to be included as part of the app/mainframe interface 30.

One example of a domain model 25 is shown in Appendix 1.

In the example shown in Appendix 1, "SampleMobileSystem" refers to the development and operational platform 50, having key/connection information, and an access keys and secrets information (e.g., user IDs and passwords). There are two separate apps 40 designed to interface with the development and operational platform 50, "SampleMobileApp1" and "SampleMobileApp2", each having key/connection information, and an access keys and secret information. For example, "SampleMobileApp1" might be designed to employees of an organization, while "SampleMobileApp2" might be for customers. This example also provides for three users (Bob, Sarah, and Frank), for different apps, and an administrator, each with IDs. The example also defined read/write privileges for the various users. The example further provides for two attributes for "cloud" data source, namely a user ID, and a DOB. The example also provides for some data populated into the employee database related to Aaron and Charlie. For the "inventory" data source, the example provides the necessary information for the app 40 to interact with the data source. Obviously, for each app 40, and mainframe/enterprise/back end system 45, the domain model 25 will be different.

The domain model 25 can be rendered for end user review in multiple ways, including UML based domain model, raw XML, an HTML based webpage and/or implementation model via a middleware provider known to those in the industry.

Creation of App/Mainframe interface

After the domain model 25 is created, either manually or automatically, the domain model 25 is processed and analyzed by a domain model processor 120 to generate the app/mainframe interface 30. In one embodiment, the domain model processor 120 reads the domain model 25, and based on its content, automatically accesses the applicable specific computer code bases from the preconstructed code set 35, creates any app specific connectors, and populates them to a predefined development and operational platform 50. In another embodiment, the predefined development and operational platform 50 contains the preconstructed code set 35, the domain model processor 120 reads the domain model 25, and based on its content, creates any app specific connectors, and populates the app specific connectors to the predefined development and operational platform 50 (since the preconstructed code set 35 already resides there). The compilation of specific computer code bases from the preconstructed code set 35 and app specific connectors create a mobile consumable API, consisting of the necessary connections, interfaces, interaction, features, functionality, and requirements for the mobile app developer to interact with the mainframe/enterprise/back end systems 45, and is depicted in FIG. 1 as the app/mainframe interface 30.

The app developer may then build the mobile app 40, for example, the user interface, that interacts and interfaces with the app/mainframe interface 30 on the development and operational platform 50. The actual mobile app development can follow those standards know to those of skill in the art. The mobile app 40 will eventually reside on user mobile devices. The app/mainframe interface 30 may have computer code (i.e., logic) to implement any of the features, functionality, and requirements discussed above, including the following:

- Ability to simplify all data sources 60 into a REST based API standard for general create, read, update, and delete functionality.
- Ability to simplify messaging 65 based interaction to a single API standard and broker message calls between sources and mobile clients using any preferred messaging mobile protocols.
- Ability to simplify logic to single API standard to communicate with all possible sources.
- Ability to describe all data inputs, message inputs, logic inputs and integrations potentially leveraging a web based console.
- Ability to scale performance loads and balance among cloud and on-premise servers.

Ability to leverage data and messaging from within logic. Defined logic make calls to data source, defined logic can send and receive messages.

Ability to leverage message protocols to notify mobile clients of data changes. The manifests can be a mobile client requesting data from a data source. The codified middleware will additionally include the ability the automatically update that data if its source is updated over a messaging protocol.

The app/mainframe interface 30 may also have computer code (i.e., logic) to implement the following capabilities:

Ability to import and export defined data sources 60, messaging 65, logic configuration information via simple markup files.

Ability to move defined codified environment (e.g., the app/mainframe interface 30) to another installed mainframe to mobile implementation for testing and migration purposes.

The app/mainframe interface 30 preferably has the computer code (i.e., logic) to implement the following characteristics:

Flexibility—the API provided can generally be used to represent any functional behavior described in the domain model 25, including but not limited to (a) viewing and modifying information defined data sources 60; (b) executing and receiving information against defined message sources 65; and (c) executing and evaluating logic defined in logical sources 70.

Standards based—the API will support the generally accepted standards of mobile platforms, including but not limited to the ability to support (a) REST; (b) MQTT; (c) SMS/MMS; and (d) PUSH.

Mobile friendly, including but not limited to (a) limit total number of results by item number; (b) limit total number of results by response object size in bytes; (c) provide server side sorting; (d) provide server side paging; (e) provide server side filtering; and (f) provide API versions.

The present invention may also involve the step of producing a complete specification document. The specification document may be created and stored by domain model processor 120, or by separate logic, and is preferably viewable and printable. The specification document describes the complete list of the available functions available to end consumer of the defined system via the API and SDKs, and can be helpful to the app developer. SDKs are well understood to those of skill in the art, but generally, is a "tool" that developers use to access the API. An example of this documentation is shown in Appendix 2.

Implementation of the mobile app 40 may involve using any number of native client rendering technologies known to those of skill in the art. Any of these technologies may consume the APIs provided, or they may use the base app/mainframe interface 30 API. Such clients can include, but are not limited to iOS, Android, Windows Mobile, Blackberry, Raspberry Pi, Web Browsers, Windows clients, Linux Client, MacOS client, Cloud clients, and iBeacon devices.

The navigation models used by these clients are expected to be mobile standard interactions, and can include, but is not limited to, smart phone devices with tap, swipe, double tap, edge pull, multiple finger tap, and fast scroll. The user interfaces for these devices, and for the mobile app 40, can include, but is not limited to, list select, and finger drag and release. Other navigation models and user interfaces are known to those of skill in the art and are included within the scope of the present invention.

The present invention may also utilize input and interactions from remote sensors that may be separately provided, for example, from the mobile app 40, the mobile device, or some other input. These include, but are not limited to temperature, location, altitude, acceleration, velocity, photoluminescence, infrared, Bluetooth, bluetooth low energy, ibeacon, radio frequencies, moisture, humidity, time of day, gravity, specific gravity, density, geological composition, molecular analysis, flux, electromagnetism, gamma, cell counts, xray, sonar, tilt, voltage, resistance, electrical current, BTU, air pressure, and tank liquid level. In the present invention, specific computer code bases are written to implement and provide interactions with the remote sensors, and can be populated in the preconstructed code set 35. As discussed above, if interactions are desired with one or more of the remote sensors for the mobile app 40, having the preconstructed code set 35 allows the app/mainframe interface 30, including this functionality, to be automatically generated from the domain model 25. For particular sensors, app specific connectors for these sensors may also be generated and used, as discussed above. The remote sensors can be included as a category of a data source 60.

Figure 5:
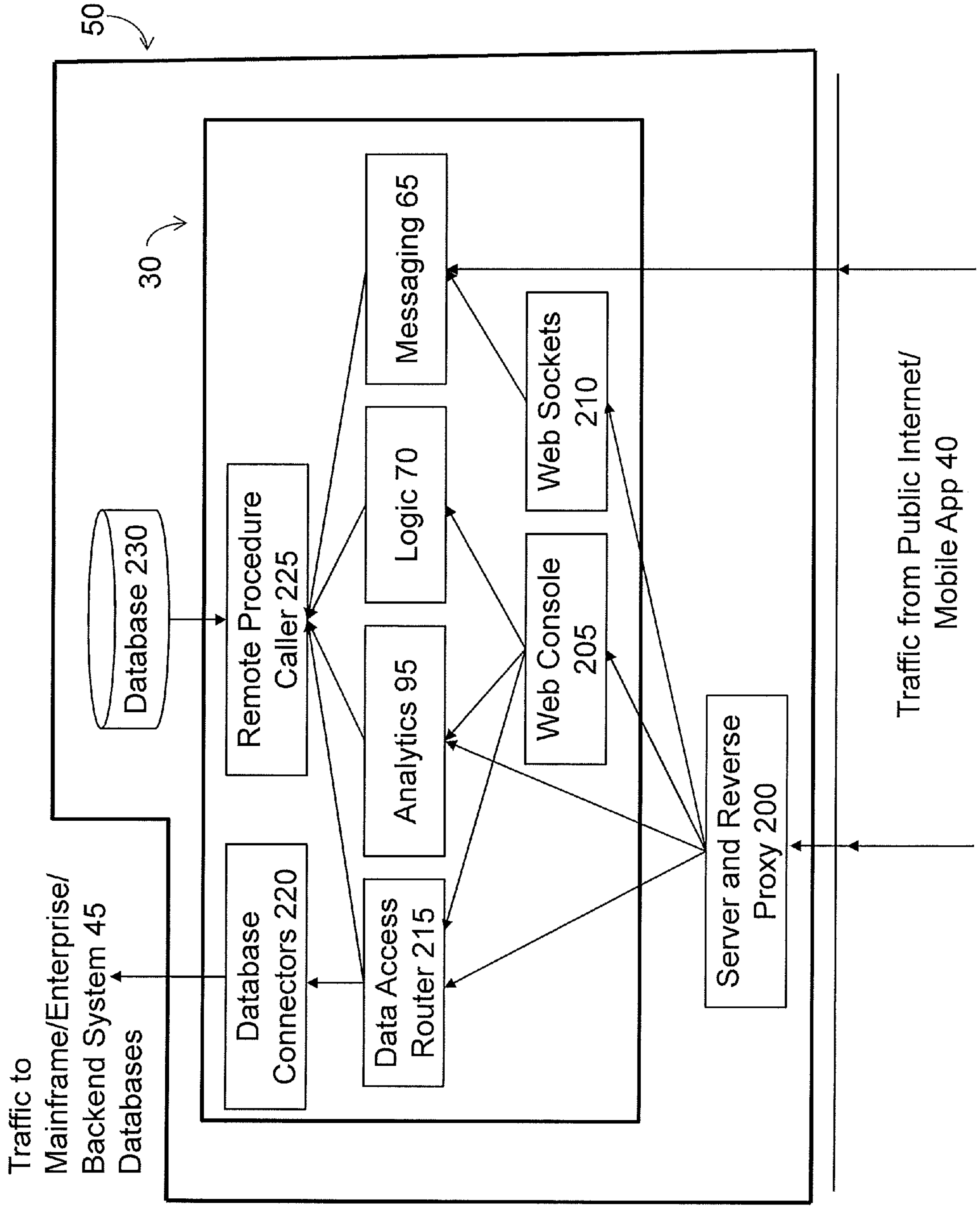
FIG. 5 shows the architecture of one embodiment of the development and operational platform of the present invention.

FIG. 5 depicts an exemplary system according to the present disclosure. In FIG. 5, the development and operational platform 50 may be any suitable computer device, such as a server, capable of storing data in memory and containing the processors for executing commands. In a preferred embodiment, the development and operational platform is one or more LINUX boxes. The development and operational platform 50 is connected to a network. The network may be of any type network or networks known in the art or future-developed, such as the internet backbone, Ethernet, Wifi, WiMax, broadband over power line, coaxial cable, and the like. The network may be any combination of hardware, software, or both. The network connects to the mobile application 40 and the mainframe/enterprise/backend system 45.

Referring to the exemplary embodiment of FIG. 5, the development and operational platform 50 may include one or more databases 230, and memory storing the following executable computer code, or logic: server and reverse proxy 200, web consol 205, web sockets 210, data access router 215, analytics 95, logic 70, messaging 65, database connectors 220, and remote procedure caller 225. Other features and functionality can be included or excluded as described herein. The executable computer code, or logic, can be processed by a processing unit 240 (not shown) of the development and operational platform 50. The processing unit 240 may be a digital processor or other type of circuitry configured to run the various logic stored on the development and operational platform 50 by processing and executing the instructions of the various logic. The processing unit 240 communicates to and drives the other elements within the development and operational platform 50.

When stored in memory, the various logic can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The memory can also be used to store any custom-developed code generated by the app developer, which can also be processed by the processing unit 240.

With continuing reference to FIG. 5, traffic from the public interne (e.g., from the mobile app 40) may be first received by a server and reverse proxy 200. The server and reverse proxy 200 provides the logic to route packets of data within the development and operational platform 50. In a preferred embodiment, this can be an open source NGINX server and reverse proxy, although other options are known and understood to those of skill in the art. Depending on the nature of the information received and processed, information can be transmitted and processed by other logic as shown in FIG. 5. The database 230 can be used, among other things, to locally store data that may be desired by the user. In a preferred embodiment, the database 230 is the open source database Cassandra.

The web console 205 provides the logic for a user interface for the mobile app developer and/or platform administrator to access the development and operational platform 50. The web console 205 may interface and interact with various input devices, for example, a keyboard, a switch, a mouse, and/or other type of interface, and various display devices used to display data to the user. The web console 205 can be used to input data from a user, generate and view reports, analytics 95, and other aspects of the development and operational platform 50.

The web sockets 210 provides the logic to establish communication between the server and reverse proxy 200 and the messaging 65, and is well understood by those of skill in the art. For example, if a message is being sent from a mobile smartphone to a sensor, the web socket 210 can translate the web traffic to a native messaging traffic for receipt and interpretation by the messaging 65 logic.

As shown in FIG. 5, in some instances, traffic from the public internet (e.g., from the mobile app 40) may also be provided directly to messaging 65, rather than routed through the server and reverse proxy 200.

The data access router 215 provides the logic to determine, among other things, where to access data, for example, from the "local" database 230, or from the mainframe/enterprise/backend system 45 databases, and is well understood by those of skill in the art.

The analytics 95, logic 70, and messaging 65, provides the computer software code for implementing the logic for the analytics, logic, and messaging, respectively, discussed at length above. As an example, the messaging 65 logic can convert various messages to their base common denominator for further distribution and/or processing. In this exemplary embodiment, advertising 75, financial transactions 80, social 85, performance 90, security 100, quality/testing 105, are not specifically shown, but can obviously be included, as would be understood to those of skill in the art. As discussed above, some of skill in the art might include such logic in one or more of the categories disclosed in FIG. 5. As also discussed, other features and functionality that are known to skill in the art could also be included in accordance with the concepts shown in FIG. 5.

The database connectors 220 provide the logic to connect to the mainframe/enterprise/back end system 45 databases, which can also be a data source 60. The remote procedure caller 225 is well understood by those of skill in the art, and essentially acts as a "traffic cop" to instruct the system where to get certain data.

In this exemplary embodiment shown in FIG. 5, the web console 205, web sockets 210, data access router 215, analytics 95, logic 70, messaging 65, database connectors 220, and remote procedure caller 225, which collectively constitutes the app/mainframe interface 30, are automatically generated from the domain model 25 according to the present invention. The web console 205, web sockets 210, data access router 215, analytic 95, logic 70, messaging 65, database connectors 220, and remote procedure caller 225 are preferably in executable computer code format, and provide all web assets, including HTML/javascript, necessary to allow interaction between the mobile app 40 and mainframe/enterprise/backend systems 45. In making the development and operational platform 50 available to the mobile application 40 developer, the development and operational platform 50 can also include the server and reverse proxy 200 and optional databases 230.

The server and reverse proxy 200, web consol 205, web sockets 210, data access router 215, analytics 95, logic 70, messaging 65, database connectors 220, remote procedure caller 225 (or other "connectors" as described above), and database 230 may be provided on a single computer system, or node (e.g., a single LINUX box), or deployed across multiple nodes. With regard to clustering like functional nodes, most operate independently, e.g., they know of each other's existence, but do not require communication amongst the cluster. However, in some embodiments, for example, if separate nodes include instances of the database 230 and messaging 65, internal synchronization mechanisms are preferably enabled. Thus, a first node may include the server and reverse proxy 200, web consol 205, web sockets 210, data access router 215, analytics 95, logic 70, messaging 65, database connectors 220, remote procedure caller 225, and database 230, and a second node may include only messaging 65 and database 230. In this example, the remote procedure caller 225 can connect to both messaging 65 instances and both database 230 instances, web sockets 210 can connect to both messaging 65 instances, the two messaging 65 instances can be connected, and the two database 230 instances can be connected. In other embodiments, a separate node can include a mirror instance of the configuration on the first node, for example, as a backup system.

As discussed above, the web console 205, web sockets 210, data access router 215, analytics 95, logic 70, messaging 65, database connectors 220, and remote procedure caller 225 (or other "connectors" as described above), can include all the computer code from the preconstructed code set 35, and/or app specific connectors, associated with that logic, or it may contain only those portions of the preconstructed code sets 35 and/or app specific connectors for those connections, features, and functionality needed for the app/mainframe interface 30 for a particular app 40. As discussed above, the phrase "app specific connectors" refers to the specifically configured/modified computer code generated from the domain model 25, and may be included within the web console 205, web sockets 210, data access router 215, analytics 95, logic 70, messaging 65, database connectors 220, and remote procedure caller 225 shown in FIG. 5, and any other features and functionality described herein. Thus, the analytics 95 logic may include portions of the preconstructed code set 35 and app specific connectors, messaging 65 logic may include portions of the preconstructed code set 35 and app specific connectors, and web console 205 logic may have only those portions of the preconstructed code set 35 associated with the web console 205 (e.g., no app specific connectors were generated for the web console 205 logic).

Thus, in one aspect, the invention provides a process to construct a complete definition of backend requirements exposed in a standards way such they can be generically accessed and referenced from mobile device interfaces.

These mobile device interfaces may include native smartphone UI based languages, implemented as cross platform hybrid based applications, or via pure autonomous based sensor applications. The method may include the some traditional steps undertaken by an app developer, including identifying information providers (and associated tasks discussed above), and identifying integration providers (and associated tasks discussed above), and identifying system behaviors (and associated tasks discussed above). The foregoing steps are then used to create a domain model 25, which can be processed and analyzed by specifically programmed computer logic to automatically generate the app/mainframe interface 30, stored on and made available to developers on a development and operational platform 50. Thus, in some ways, the system and method can provide a "tool kit" of the necessary software tools, connectors, protocols, and drivers to automatically create the necessary interface between the mobile app 40 and the mainframe/enterprise/back end system 45.

Illustrative Example

Many of these concepts are best explained via a simple example. Take for instance a mobile app developer considering development of a mobile application that would use some contextual information from the mobile device, require some data collections accessible from the device, and also expect to interact with a sequence of systems of record within a corporate environment. For this illustrative example, the app developer knows that following features, functionality, and requirements are desired: (1) the mobile application senses where app users are in the store, either through GPS or other geo-fencing technologies; (2) the system knows where a manager is in the store; (3) the system knows the number of customers in a particular area of the store, and the stockroom inventory related to that particular area of the store; (4) authentication of the manager access to the stockroom inventory; (5) ability of the manager to check available inventory; and (6) if inventory is insufficient, ability to submit a new PO to their supplier for more TVs.

For this illustrative example, the mobile device requires knowledge of information providers 10, and specifically data sources 60, for database interaction, integration providers 15 for interaction with the procurement system, and system behaviors 20 for interaction with the GPS or geo-location devices. After capturing each point's necessary configuration, the domain model 25 can be created (either manually or automatically as described). For this example, the domain model 25 may be as depicted in Appendix 3. As discussed above, after the domain model 25 is created, the domain model 25 is processed and analyzed by a domain model processor 120 to generate the app/mainframe interface 30. The domain model processor 120 reads the domain model 25, and based on its content, in this embodiment, automatically pulls the applicable specific computer code bases from the preconstructed code set 35, generates the app specific connectors, and populates them to the development and operational platform 50 for the app developer access.

As depicted in the examples of various embodiments, the present invention may be implemented by a computer system to process the information and data gathered during the process. The volume of information processed, combined with the speed at which the information must be processed, makes the use of a computer system advantageous. The computer system will typically have a processor, such as central processing unit (CPU), where the processor is linked to a memory, an input, and an output. A network computer may include several other components as well. For example, the memory components may include a hard disc for non-transitory (or non-volatile) storage of information, as well as random access memory (RAM). Non-transitory computer readable media in the present invention comprise all computer-readable media except for a transitory, propagating signal. The input components may include a keyboard, a touch-screen, a mouse, and a modem for electronic communication with other devices. The output components may include a modem, which may be the same modem used for the input or a different one, as well as a monitor or speakers. Many of the different components may have varying physical locations, but they are still considered a computer for purposes of this description. For example, the memory may be on a hard drive in the same physical device as the processor, or the memory component may be remotely located and accessed as needed using the input and output. The memory may also have one more programs to carry out the functions described previously. The memory components may also have one more databases along with related data.

APPENDIX 1

```
<system name="SampleMobileSystem" key="ALKH34KHHQQ" secret="2354089hLKHLSKJQ">
    <apps>
        <app name="SampleMobileApp1" key="ALKH34KHHQQ"
secret="2354089hLKHLSKJQ"/>
        <app name="SampleMobileApp2" key="ALKH34KHHQQ"
secret="2354089hLKHLSKJQ"/>
  </apps>
  <auth>
    <externalRegistry></externalRegistry>
    <users>
        <user name="Bob" id="234234" roles="app1"></user>
        <user name="Sarah" id="45745" roles="app2"></user>
        <user name="Frank" id="67853" roles="admin"></user>
    </users>
    <roles>
        <role name="admin"/>
        <role name="app1"/>
        <role name="anon"/>
    </roles>
  </auth>
  <resources>
    <resource type="datasource" source="cloud" name="employees">
        <config>
            <access>
                <role name="admin" read="true" write="true" create="true"
delete="true">
```

APPENDIX 1-continued

```
            <role name="app1" read="true" write="false" create="false"
delete="false">
          </access>
          <attributes>
            <attribute name="userId" type="string"/>
            <attribute name="DOB" type="date"/>
          <attributes>
        </config>
        <content>
          <entity>
            <userId><![CDATA[Aaron]]></userId>
            <DOB><![CDATA[10241979000000]]></DOB>
          </entity>
          <entity>
            <userId><![CDATA[Charlie]]></userId>
            <DOB><![CDATA[11141992000000]]></DOB>
          </entity>
        </content>
      </resource>
      <resource type="datasource" source="remote" name="inventory">
        <config>
          <access>
            <role name="admin" read="true" write="true" create="true"
delete="true">
            <role name="app1" read="true" write="false" create="false"
delete="false">
          </access>
          <settings>
            <connection type="db2z" ipAddress="1.1.1.1" port="333"
maxConnections="25" userid="1234" password="#@)($U@#O@#" tableName="inventory"/>
          <setting>
        </config>
      </resource>
    </resources>
</system>
```

APPENDIX 2

```
Data Collection -
  Name - Customers
  ID = 23523452345345
  Schema - Name, DateOfBirth, Phone, Address, State, City, ZipCode
  REST call
  Available calls
  Get Customers
    Type: Get
    Request
      Endpoint
        https://server/api/v1/data?collectionid=23523452345345
      Headers = none
      Parameters = none
      Data = none
    Response
      {name:[STRING],DateOfBirth:[DATE], Phone:[999-999-
9999],Address:[123 Main St],State:[Texas],City:[Austin],ZipCode:[78701]}
```

APPENDIX 3

```
<InformationPoints>
  <InformationPoint>
    <id>1<lid>
    <type>RDBMS</type>
    <brand>IBM DB2</type>
    <connectURL>
      <ipAddress>192.168.1.12</ipAddress>
      <port>6789</port>
      <id>parts_user</id>
      <pwd>parts_pwd</pwd>
      <default_db>store_inventory</default_db>
    </connectURL>
  </InformationPoint>
  ......
</InformationPoints>
<IntegrationPoints>
  <IntegrationPoint>
```

APPENDIX 3-continued

```
    <id>45</id>
    <type>REST</type>
    <brand>SAP</type>
    <connectURL>
      <URL>https://procurement.mycompany.com/inventoryCheck</
      URL>
      <appKey>468EA39</appKey>
      <commandStr>orderNew</commandStr>
      <commandParam>part_id</commandParam>
    </connectURL>
  </IntegrationPoint>
</IntegrationPoints>
<SystemBehaviors>
  <Behavior>
    <id>35</id>
    <type>BLE-GPS</type>
    <brand>Arduino</brand>
    <beacon-info>
      <vendor-num>858FHSA</vendor-num>
      <store>4689</store>
      <sub-store>26</sub-store>
    </beacon-info>
  </Behavior>
</ SystemBehaviors >
```

What is claimed is:

1. A method for creating an interface for software applications interacting with an enterprise computer system comprising:

a. providing a preconstructed computer code set of connectors comprised of at least one of information provider connectors, integration provider connectors, and system behavior connectors;

b. defining a software application specific data set comprised of at least one of information providers with which the software application will interact, integration providers with which the software application will interact, and system behaviors of the software application;

c. creating a machine readable domain model from the software application specific data set; and d. processing the domain model using a domain model processor to generate a software application/enterprise interface having app specific connectors associated with the software application specific data set, and wherein said app specific connectors are derived from the preconstructed computer code set of connectors.

2. The method of claim 1, wherein the software application/enterprise interface is stored on a development and operational computer system platform.

3. The method of claim 1, wherein the software application specific data set includes an information provider with which the software application will interact, and comprises at least one of data sources, messaging, and logic execution.

4. The method of claim 1, wherein the software application specific data set includes an integration provider with which the software application will interact, and comprises at least one of advertising, financial transactions, social interaction, and user profiles.

5. The method of claim 1, wherein the software application specific data set includes a system behavior, and comprises at least one of performance, analytics, authority, authentication, encryption, and quality/testing.

6. The method of claim 1, wherein the domain model is in XML format.

7. The method of claim 1, wherein the app specific connectors include at least one of destination server IP address, credentials, token, and target data name.

8. The method of claim 1, wherein the software application specific data set is generated from a user's selections from pre-populated menus, and stored in computer memory in a machine readable format, and wherein the domain model is automatically created from the software application specific data set.

9. A method for interfacing software applications with an enterprise computer system comprising:

a. creating a machine readable domain model defining a software application specific connector data set, said software application specific connector data set comprised of at least one of an information provider with which the software application will interact, an integration provider with which the software application will interact, and a system behavior of the software application; and b. processing the domain model to automatically generate a software application/mainframe interface having at least one app specific connector associated with the software application specific connector data set, and wherein said at least one app specific connector is derived from a preconstructed computer code set of connectors comprised of at least one of information provider connectors, integration provider connectors, and system behavior connectors.

10. The method of claim 9, wherein software application/enterprise interface is stored on a development and operational computer system platform.

11. The method of claim 9, wherein the software application specific connector data set comprises at least one of data sources, messaging, logic execution, advertising, financial transactions, social interaction, performance, analytics, authority, authentication, encryption, and quality/testing.

12. The method of claim 10, wherein the software application/enterprise interface stored on the development and operational computer system platform also contains at least portions of the preconstructed computer code set of connectors.

13. The method of claim 9, wherein mobile device application/enterprise interface is in compiled computer code format.

14. The method of claim 9, wherein the machine readable domain model is in markup language format.

15. The method of claim 9, wherein the machine readable domain model is generated from a user's selections from pre-populated menus, and stored in computer memory in a machine readable format.

16. A computer system for generating a software application/enterprise computer system interface comprising:

a. memory storing a preconstructed computer code set of connectors comprised of at least one of information provider connectors, integration provider connectors, and system behavior connectors;

b. logic configured to process a machine readable domain model defining a software application specific connector data set to generate the software application/enterprise computer system interface having app specific connectors associated with the software application specific connector data set, wherein said app specific connectors are derived from the preconstructed computer code set of connectors, and wherein said software application specific connector data set is comprised of at least one of an information provider with which the software application with interact, an integration provider with which the software application will interact, and a system behavior of the software application.

17. The system of claim 16, wherein the software application specific connector data set includes a system behavior, and comprises at least one of performance, analytics, authority, authentication, encryption, and quality/testing.

18. The system of claim 16, further comprising memory storing pre-populated menus of connector data, and further comprising logic configured to process the user selected connector data to generate the machine readable domain model.

19. The system of claim 16, wherein the software application specific connector data set includes an integration provider with which the software application will interact, and comprises at least one of is advertising, financial transactions, social interaction, and user profile.

20. The system of claim 16, wherein the software application specific connector data includes an information provider with which the software application will interact, and comprises at least one of data sources, messaging, and logic execution.

* * * * *